United States Patent
Shackle et al.

[11] Patent Number: 5,980,855
[45] Date of Patent: Nov. 9, 1999

[54] METHOD FOR PREPARING LITHIATED METAL OXIDES

[75] Inventors: Dale R. Shackle; Benjamin Chaloner-Gill, both of Santa Clara, Calif.

[73] Assignee: Rentech, Inc., San Jose, Calif.

[21] Appl. No.: 09/084,806

[22] Filed: May 26, 1998

[51] Int. Cl.⁶ .......................... C01F 13/14; C01D 15/00; H01M 4/58; B01J 23/00
[52] U.S. Cl. ...................... 423/593; 423/179.5; 429/218; 502/312
[58] Field of Search ............................... 423/593, 179.5; 429/218; 502/312

[56] References Cited

U.S. PATENT DOCUMENTS

| | | | |
|---|---|---|---|
| 4,751,157 | 6/1988 | Uchiyama et al. | 429/194 |
| 4,751,158 | 6/1988 | Uchiyama et al. | 429/194 |
| 4,879,190 | 11/1989 | Lundsgaard | 429/94 |
| 4,925,751 | 5/1990 | Shackle et al. | 429/191 |
| 4,925,752 | 5/1990 | Fauteux et al. | 429/191 |
| 4,935,317 | 6/1990 | Fauteux et al. | 429/192 |
| 5,326,545 | 7/1994 | Koksbang et al. | 423/62 |
| 5,520,903 | 5/1996 | Chang et al. | 423/593 |
| 5,576,120 | 11/1996 | Saidi | 429/218 |
| 5,616,437 | 4/1997 | Gao | 429/245 |
| 5,620,811 | 4/1997 | Zhang | 429/192 |
| 5,622,793 | 4/1997 | Iijima et al. | 429/218 |
| 5,648,187 | 7/1997 | Skotheim | 429/213 |
| 5,670,277 | 9/1997 | Barker et al. | 429/220 |
| 5,672,446 | 9/1997 | Barker et al. | 429/218 |
| 5,690,703 | 11/1997 | Mitchell et al. | 29/623.5 |
| 5,700,598 | 12/1997 | Denis et al. | 429/218 |
| 5,759,715 | 6/1998 | Baker et al. | 429/197 |
| 5,851,696 | 12/1998 | Saidi et al. | 429/218 |

OTHER PUBLICATIONS

Howard T. Evans, Jr., Molecular Structure of the Isopoly complex Ion, Decavanadate $(V_{10}O_{28}^{6-})^1$, *Inorganic Chemistry*, vol. 5, No. 6, pp. 967–977 (1996).

A. G. Swallow, et al., The Crystal Structure of Pascoite, $Ca_3V_{10}O_{28} \cdot 17H_2O$, *Acta Cryst.*, 21, pp. 397–405 (1966).

Kenji Nomiya, et al., Structural Stability Index of Heteropoly—and Isopoly—Anions—II, *Tebrahedron*, vol. 4, No. 1, pp. 89–95 (1985).

C.M. Flynn, Jr., et al., 1:13 Heteropolyvanadates of Manganes (IV) and Nickel (IV)[1,] *JACS*, 92:1, pp. 85–90 (1970).

The Chemical Society of Japan, *Chemistry Letters*, pp. 1267–1270, (1986).

C.M. Flynn, Jr. et al., Heteropolyvanadomanganates (IV) with Mn:V = 1:11 and 1:4, *Inorganic Chemistry*, vol. 9, No. 9, pp. 2009–2014 (1970).

*Primary Examiner*—Gary P. Straub
*Assistant Examiner*—Cam N. Nguyen
*Attorney, Agent, or Firm*—Thompson Hine & Flory LLP

[57] ABSTRACT

A method for lithiating a metal compound with lithium metal in the presence of a catalyst, wherein the lithiated metal compound is useful as a cathode in an electrochemical battery, is described.

11 Claims, 3 Drawing Sheets

METHOD FOR PREPARING LITHIATED METAL OXIDES

BACKGROUND OF THE INVENTION

This invention relates to a process for lithiating a metal compound in the presence of an aromatic hydrocarbon catalyst.

The demand for improved energy storage devices such as electrochemical batteries has increased steadily. The recent trend towards smaller and lighter electronic devices has precipitated the demand for portable electronic equipment, where expense, durability, reliability and high energy density are critical.

Non-aqueous lithium electrochemical cells typically include an anode, an electrolyte prepared from a lithium salt dissolved in one or more organic solvents and a cathode of an electrochemically active material, typically a chalcogenide of a transition metal. During discharge, lithium ions from the anode pass through the electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode.

U.S. Pat. Nos. 4,751,157 and 4,751,158 to Uchiyama et al. disclose cathode materials for use in lithium electrochemical cells. The cathode material comprises a mixed metal oxide as an active material, along with a conductive diluent and a binder which is pressed into electrodes on a nickel screen and sintered under vacuum. The cathode materials are used in cells which contain a liquid electrolyte, and more particularly, those which contain $LiAsF_6$ in an aprotic solvent, such as methyl formate.

U.S. Pat. No. 4,416,915 to Palmer et al. discloses a chalcogenide cathode made by applying a slurry of a mixture containing at least one intercalatable layered transition metal chalcogenide, a conductivity enhancing agent and a binding agent in a vehicle, to a high porosity current collector substrate. The cathode material is utilized in a non-aqueous lithium cell having an electrolyte comprising an electrolyte-solvent mixture.

U.S. Pat. No. 4,560,632 to Alberto discloses a molded porous cathode collector for use in non-aqueous cells. The collector includes a particulate carbonaceous conductive material bonded with a suitable binder, and having on its surface a coating of a vinyl polymer film to improve its mechanical strength and handling characteristics. The cathode collector is used in association with liquid cathode materials.

Solid state rechargeable electrochemical cells constructed of an alkali metal foil anode, such as lithium foil, an ionically conducting polymeric electrolyte and a composite cathode containing a finely divided transition metal oxide are described extensively in the patent literature. See, for example U.S. Pat. Nos. 4,303,748 to Armand; 4,589,197 to North; 4,547,440 to Hooper et al; and 4,228,226 to Christian. U.S. Pat. No. 5,690,703 to Mitchell et al. discloses a carbon anode such as coke or graphite intercalated with lithium ions.

As discussed by Uchiyama et al., supra, rechargeable batteries employing lithium systems offer the potential for both high energy and light weight. While lithium intercalating transition metal oxides are particularly attractive because of their tendency to possess high energy content, the known oxides are either expensive to prepare as in the case of vanadium oxides or they are electronic insulators thereby preventing their use for high battery current applications. Another difficulty with transition metal oxides, especially $V_2O_1$ is susceptibility to over-discharge which results in structural rearrangement and severe losses in cell capacity.

In many battery systems it is necessary to have a source of alkali metal ions in one of the electrodes. For example, in the lithium ion system the source of lithium ions is a mixed metal oxide such as $LiCoO_2$. This requirement severally limits the choice of available electrode materials.

Accordingly, there exists a need for expanding the choice of electrode materials possessing high ionic and electronic conductivity as well as good mechanical strength and improved rechargeability for use in battery systems.

SUMMARY OF THE INVENTION

In accordance with the present invention there is provided a method for lithiating a metal compound. The method comprises reacting the metal compound with lithium metal in the presence of an aromatic hydrocarbon: Theoretically, eight lithium ions can be inserted into $V_6O_{13}$. The theoretical value of inserting eight lithium ions is very difficult to obtain. Typically $V_6O_{13}$ cycles between 5–6 lithium ions. Hence, the reactions put forth in this application focus on the cycling of up to six lithium ions. The method of the present invention is illustrated by equation (I):

$$V_6O_{13} + 6Li \rightarrow Li_6V_6O_{13} \qquad (I)$$

Reactions of this type with metallic lithium are very difficult to control. In accordance with the present invention, this problem has been overcome by employing certain aromatic hydrocarbons as a catalyst.

DETAILED DESCRIPTION OF THE INVENTION

Figure 1:
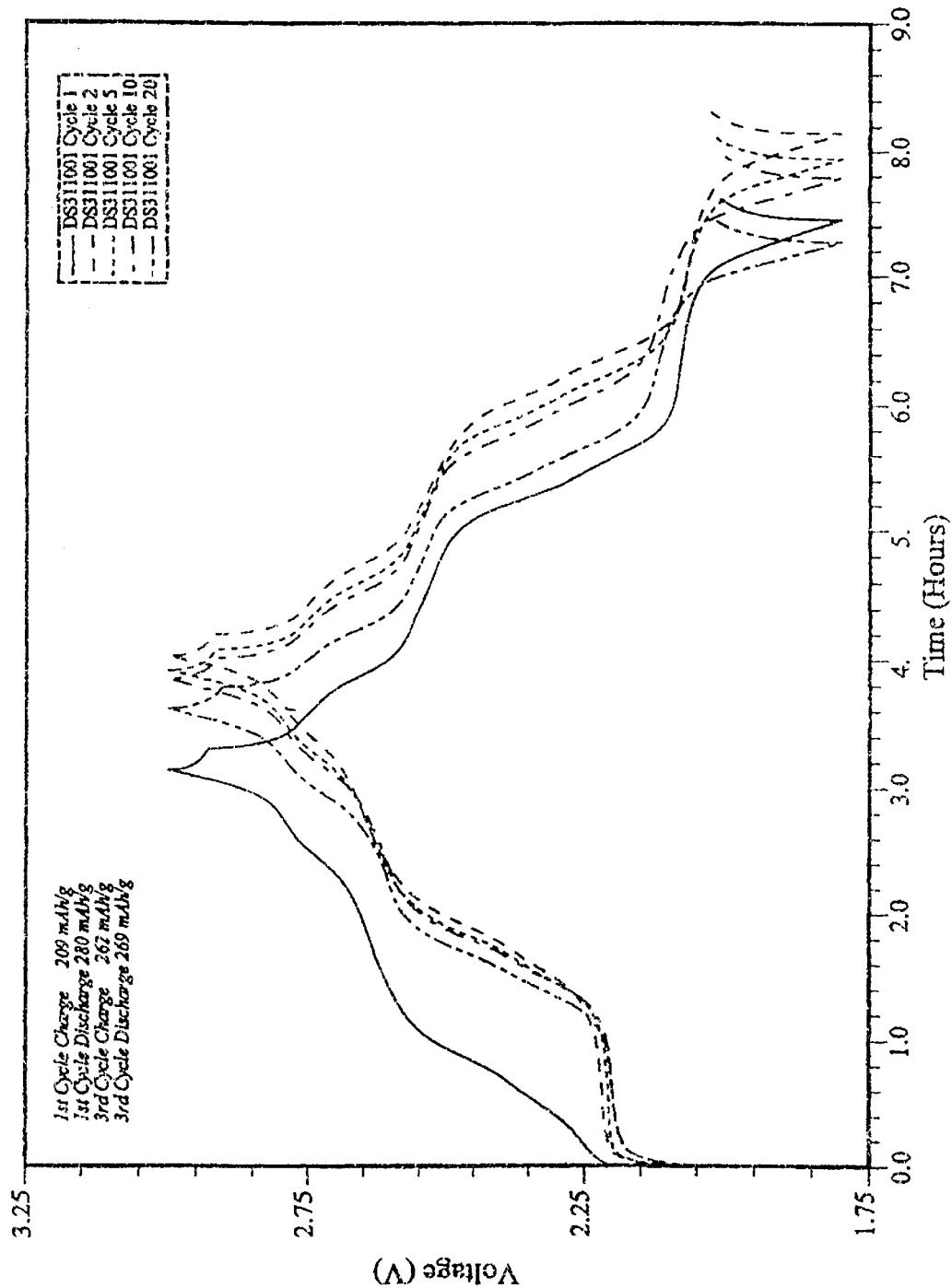
FIG. 1 shows the charge/discharge cycles for the battery of Example 1.

It is known that lithium metal in the presence of a solvent will react with some aromatic hydrocarbons to produce radical anions. In accordance with the present invention, the radical anion acts as an electron transfer agent to catalyze lithiation of metal oxides, preferably vanadium oxides. The reaction is used to provide a catalytic pathway for the lithiation of metal compounds according to the following equations (II) and (III):

$$Li + A \rightarrow Li^+A^- \qquad (II)$$

$$V_6O_{13} + 6Li^+A^- \rightarrow Li_6V_6O_{13} + A \qquad (III)$$

where A is an aromatic hydrocarbon catalyst.

The selection of the appropriate catalyst can be facilitated by considering the following reactions:

E(volts)

-continued $$Li \rightarrow Li^+ + e^- \quad 3.04$$

$$\frac{A + e^- \rightarrow A^-}{Li + A \rightarrow Li + A^-} \quad \frac{RP}{(3.04 + RP)}$$

$$V_6O_{13} + 6Li \rightarrow Li_6V_6O_{13} \quad 1.80$$

$$\frac{6Li^+A^- \rightarrow 6Li + 6A}{V_6O_{13} + 6Li^+A^- \rightarrow Li_6V_6O_{13} + 6A} \quad \frac{-(3.04 + RP)}{-(1.24 - RP)}$$

where RP is reduction potential and E is reaction potential.

From chemical thermodynamics it is known that for a reaction to proceed, the reaction potential E should have a positive value. The above equations can be used to select materials which may be a good catalyst for the desired lithiation reaction. A number of potential catalysts and their respective reduction potentials are listed in Table 1.

TABLE 1

Reduction Potentials for Hydrocarbon Catalysts

| Hydrocarbon Catalysts | $-E_{½}$ versus SCE |
|---|---|
| Triphenylmethyl | 1.05 |
| 1-Phenyl-6-biphenylenehexatriene | 1.35 |
| 1-Phenyl-4-biphenylenebutadiene | 1.46 |
| Acenaphthylene | 1.65 |
| Tetracene | 1.58 |
| Perylene | 1.67 |
| 1,2-Benzypryene | 1.85 |
| Fluoranthene | 1.77 |
| 1,4-Diphenylbutadiene | 2.00 |
| Azulene | 1.64 |
| Anthracene | 1.96 |
| Pyrene | 2.11 |
| 1,2-Benzanthracene | 2.00 |
| 1,2,5,6-Dibenzanthracene | 2.03 |
| 4,5 Benzypyrene | 2.00 |
| Stilbene | 2.16 |
| Chrysene | 2.30 |
| 2,2'-Binaphthyl | 2.21 |
| p-Quaterphenyl | 2.20 |
| Coronene | 2.04 |
| 1,1-Diphenylethylene | 2.25 |
| p-Terphenyl | 2.33 |
| Phenanthrene | 2.46 |
| Naphthalene | 2.50 |
| Butadiene | 2.63 |
| Styrene | 2.37 |
| Triphenylene | 2.49 |
| Biphenyl | 2.70 |

In the lithiation of $V_6O_{13}$, one can choose several catalysts from Table 1 above and insert the reduction potential for each of the prospective catalysts into the equation:

$$E = -(1.24 - RP)$$

to predict the potential effectiveness of each of the chosen catalysts in the lithiation of $V_6O_{13}$. A selection of potential catalysts is shown in Table 2.

TABLE 2

Reduction Potential (Lithiation of $V_6O_{13}$)

| Catalyst | RP | E |
|---|---|---|
| Benzophenone | −1.72 | 0.48 |
| Stilbene | −1.92 | 0.68 |
| Styrene | −2.13 | 0.89 |
| Naphthalene | −2.30 | 1.06 |
| Biphenyl | −2.46 | 1.22 |

Based on the results in Table 2, one might predict the effectiveness of the five catalysts chosen to be benzophenone<stilbene<styrene<naphthalene<biphenyl.

The foregoing equations can be readily extended to select catalysts for the lithiation of other metal oxides. The value −1.24 is the arithmetic difference between the open cell potential of the lithiated compound (e.g., $Li_6V_6O_{13}$) relative to a lithium anode (hereafter "OCP") and 3.04, which is the reduction potential of lithium. Hence, potentially useful catalysts for lithiating other metal oxides should have a reduction potential (RP) which satisfies the equation:

$$RP < OCP - 3.04$$

Any of the metal oxides conventionally used in cathodes of lithium cells can be lithiated in accordance with this invention including $V_2O_5$ and $V_6O_{13}$. In accordance with a one embodiment of the invention, the vanadium oxide has a cage structure. The vanadium oxide may be an isopolyvanadate or heteropolyvanadate, i.e., the cage structure may contain only vanadium and oxygen atoms or it may also contain other metallic and non-metallic atoms such as manganese, phosphorous and the like. Such lithiated vanadium oxide materials having a cage structure found to be effective in the present invention include $Li_6V_{10}O_{28} \cdot xH_2O$, $Li_7V_{13}O_{38} \cdot xH_2O$, $Li_{12}PV_{13}O_4$, $Li_8V_9O_{19}$, $Li_6V_{10}O_{28}$, $Li_3MnV_9O_{26}$, $Li_4MnV_{10}O_{29}$, $Li_5MnV_{11}O_{32}$, $Li_6MnV_{12}O_{35}$ and $Li_7MnV_{12}O_{35}$ and $Li_7MnV_{13}O_{38}$. Mixtures of one or more of these lithiated oxides with other metal oxides or lithiated metal oxides may also be used in carrying out the present invention.

The lithiated vanadium oxides of the present invention are particularly useful as a cathode in electrochemical batteries.

In addition to being useful in lithiating vanadium oxides, the method of the present invention can be used to lithiate other metal oxides.

In describing the preferred embodiments of this invention, certain terminology will be utilized for the sake of clarity. It is intended that this terminology cover not only the recited embodiments, but all technical equivalents which operate in the same manner, for the same purpose to achieve the same result.

The term "cage structure" as used herein means a system of bonds connecting each atom in the compound to its neighbor in a polyhedron and is to be distinguished from the layered or channeled structure of conventional vanadium oxides. These lithiated vanadium oxide cage structures provide an inexpensive, high energy cathode material with excellent cycle-life and rate capabilities when used in a lithium electrochemical cell.

The term "electrochemical cell" refers to a composite structure containing an anode, a cathode, and an ion-conducting electrolyte interposed therebetween.

The term "battery" refers to two or more electrochemical cells electrically interconnected to provide appropriate voltage and current levels.

The term "salt" refers to any salt, for example, an inorganic salt, which is suitable for use in a non-aqueous electrolyte. Representative examples of suitable inorganic salts are alkali metal salts of less mobile anions of weak bases having a large anionic radius. Examples of such anions are $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)/_3CLi$, $NaSCN$, and the like. The inorganic ion salt preferably contains at least one cation selected from the group consisting of Li, Na, Cs, Rb, Mg and K.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt.

The cathode material is typically coated or laminated on one or both surfaces and in the voids of a collector material. This provides a greater amount of electrical contact area between the electrically conductive material of the cathode composition and the current collector substrate. In one manifestation, the compatible cathodic material can be mixed with a polymeric binder to form a positive cathodic plate. Suitable binders for use in the cathode have a molecular weight of from about 1,000 to 5,000,000. Preferably, the cathode is prepared from a cathode paste which comprises a litiated vanadium oxide cage structure material; an electroconductive agent such as carbon black or graphite; a suitable polymeric binder that may include ethylene propylene diene termonomer (EPDM), polyvinylidene difluoride (PVDF), ethylene acrylic acid copolymer (EAA), ethylene vinyl acetate copolymer (EVA), EAA/EVA copolymer mixtures, and the like; and a volatile solvent such as acetone or THF (tetrahydrofuran). Typically, these components are present in an amount of about 50 to 75% vanadium oxide, about 1 to 30% electroconductive agent, and about 1 to 20% binder. The active cathode material preferably has a particle size of less than 1 micron but can range up to about 20 microns, e.g., about 0.5 to about 20 microns.

The alkali metal anode layer may take the form of a lithium foil, a lithium coated foil such as nickel or copper foil having a layer of lithium deposited on its surface or a lithium alloy. Also useful in the invention are carbon anodes such as coke and graphite intercalated with lithium ions such as those described in U.S. Pat. No. 5,690,703 to Mitchell et al., the contents of which are incorporated herein by reference.

The anode and cathode each also preferably includes a current collector that comprises, for example, a screen, grid, expanded metal, woven or non-woven fabric formed from an electron conductive material such as metals or alloys. Each current collector is also connected to a current collector tab which extends from the edge of the current collector. In batteries comprising multiple electrochemical cells, the anode tabs are preferably welded together and connected to a copper or nickel lead. The cathode tabs are similarly welded and connected to a lead. External loads can be electrically connected to the leads. Current collectors and tabs are described in U.S. Pat. Nos. 4,925,752, 5,011,501, and 5,326,653.

Useful collector substrates having a plurality of surface voids include carbon, copper, aluminum, nickel, steel, lead and iron materials, or combinations thereof, in the following configurations: foamed nickel or similar foamed metals; foamed glass that has been plated with an inert or noble metal to increase surface conductivity; foamed polymers containing a surface or bulk conductivity agent; foamed Ti-, Nb-, Zr-, W-, Ta-carbides; foamed molybdenum disilicide; reduced metal reacted molecular or carbo sieves; chemically etched metal foils; electrodeposited films; carbon, graphite or vitreous carbon fiber or fibril laminates of ultra high surface area. Foamed metals in the form of a mesh or grid and chemically etched metal foils are preferred substrates. The thickness of the current collector should be as thin as practical and preferably is about 5 to 25 microns.

The electrolyte contains an inorganic ion salt and a polar, aprotic solvent. Typical examples of solvents include such materials as dimethyl carbonate, diethyl carbonate, propylene a carbonate, ethylene carbonate, methyl ethyl carbonate, methyl propyl carbonate, gamma-butyrolactone, triglyme, tetraglyme, dimethylsulfoxide, dioxolane, sulfolane, and the like or mixtures thereof. When using propylene carbonate-based electrolytes in an electrolytic cell with graphite anodes, a sequestering agent, such as a crown ether, is added in the electrolyte. The electrolyte requires the use of a separator between the cathode and the anode. Typically, the separator is a non-conductive polymeric film such as Celgard 3500, a polypropylene separator manufactured by Hoechst Celanese, Dallas, Tex. The use of a separator is not required with the solid electrolyte material.

Another class of useful electrolytes are solid solutions of an ionizable alkali metal salt or an alkaline earth salt in an ionically conductive polymer such as solid solutions of an alkali metal salt, an ionically conductive polymer and a plasticizer. General examples of useful ionically conductive polymers are described in U.S. Pat. No. 4,303,748 to Armand and European Application 0 145 498 to Cook. These polymers have repeating units containing at least one heteroatom such as an oxygen or nitrogen atom. They can be represented as polymers having the repeating unit:

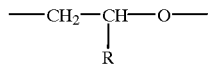

wherein R is hydrogen or a group $R_a$, $—CH_2OR_a$, $—CH_2OR_eR_a$, $—CH_2N(CH_3)_2$, in which $R_a$ is an alkyl group containing 1 to 16 carbon atoms and preferably 1 to 4 carbon atoms or a cycloalkyl group containing 5 to 8 carbon atoms, and $R_e$ is an ether group of formula $—CH_2—CH_2O_p—$ wherein p is a number from 1 to 100, preferably 1 or 2; or having the repeating unit:

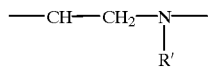

wherein R' is $R_a$, or $R_eR_a$, as defined above; or having the repeating unit:

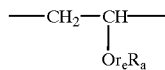

wherein $R_e$ and $R_a$ are as defined above. Copolymers of the above polymers may also be useful.

The method of the present invention is illustrated in the following non-limiting examples.

EXAMPLE 1

Synthesis of $Li_6V_6O_{13}$ using Benzophenone

Benzophenone 10.92 g was dissolved in 50 ml of tetrahydrofuran. Lithium metal 0.42 g was added to the solution and a dark blue solution formed. 5.13 g of $V_6O_{13}$ was added to the solution and the mixture was stirred for 16 hrs. Then the mixture was filtered and washed with tetrahydrofuran and then dried at room temperature. All the various reaction steps were carried out in an argon atmosphere.

The resulting solid was ground in a ball mill to reduce the particle size. The material was then incorporated into a coating formulation with the following composition.

Test material 76%

Acetylene black carbon 14%

Kynar 2801 (a vinylidene fluoride resin) 10%

This formulation is then coated from an acetone solution onto an aluminum foil substrate. A test battery was then constructed using a 2 cm² piece of the above coating as a cathode, a polypropylene separator (Celgard 3500), and lithium metal as the anode. The electrolyte consisted of a 1 M $LiPF_6$ in 50/50 volume % solution ethylene carbonate and dimethyl carbonate. The test battery was then repeatedly charged and discharged using a current of 0.25 mA. The cycling test results are shown in FIG. 1.

EXAMPLE 2

Figure 2:
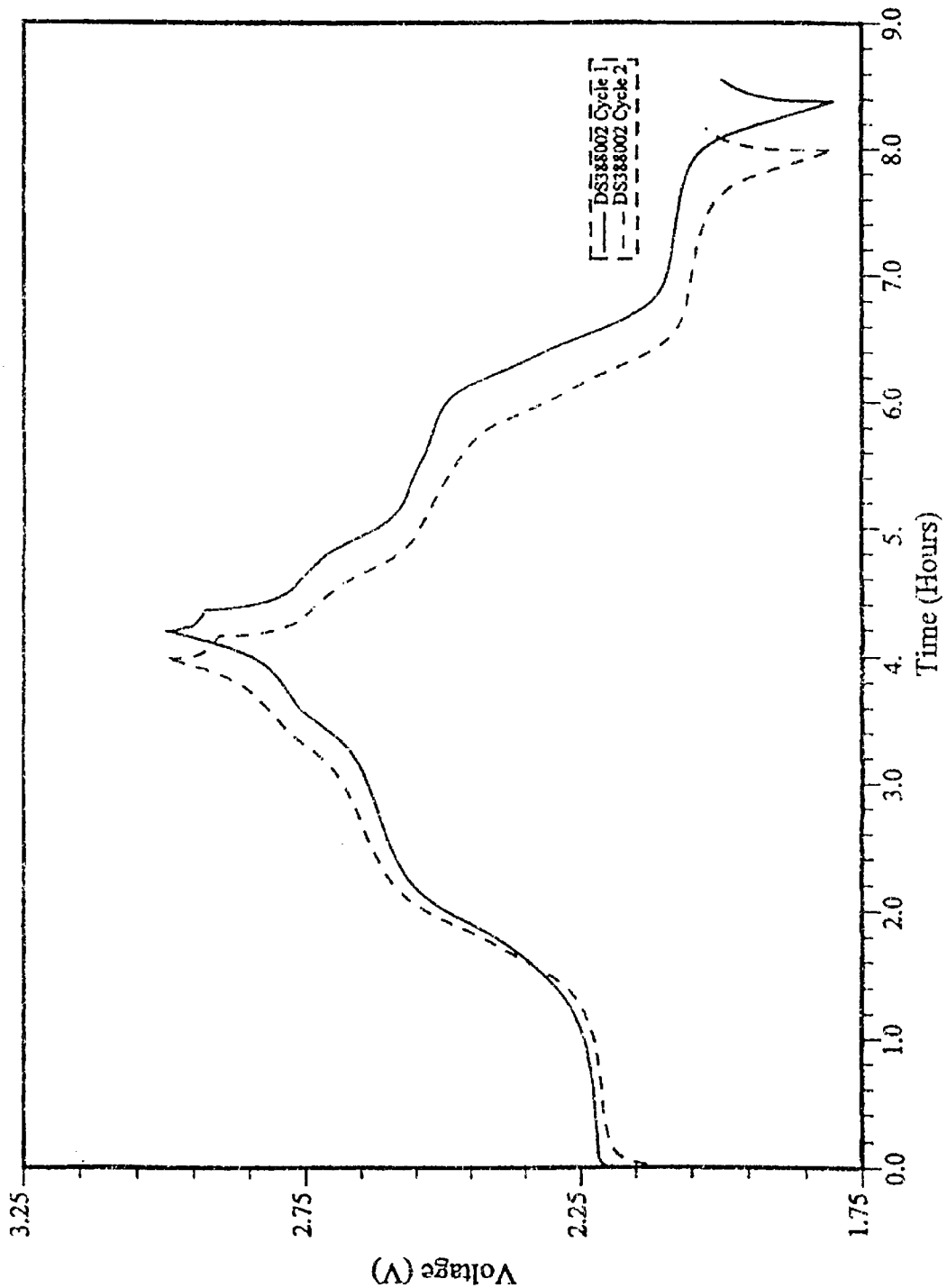
FIG. 2 shows the charge/discharge cycles for the battery of Example 2.

Preparation of $Li_6V_6O_{13}$ using Biphenyl 7.32 g of $V_6O_{13}$ and 0.1 g of biphenyl were mixed with 50 ml of tetrahydrofuran. The mixture was cooled to 10° C. and then 0.69 g of lithium metal was added over a 2 hour time span. The temperature was maintained at 10° C. and then 0.69 g of lithium metal was added over a two hour time span. The temperature was maintained at 10° C. during the addition and was maintained for an additional 4 hours. The temperature was then allowed to rise to room temperature. The resulting black solid was filtered and washed with tetrahydrofuran. Drying was done at room temperature. All operations were carried out in an argon atmosphere. The product was tested as in Example 1. The cycling test results are shown in FIG. 2.

EXAMPLE 3

Preparation of ($V_2O_5$+Li+Biphenyl)

Figure 3:
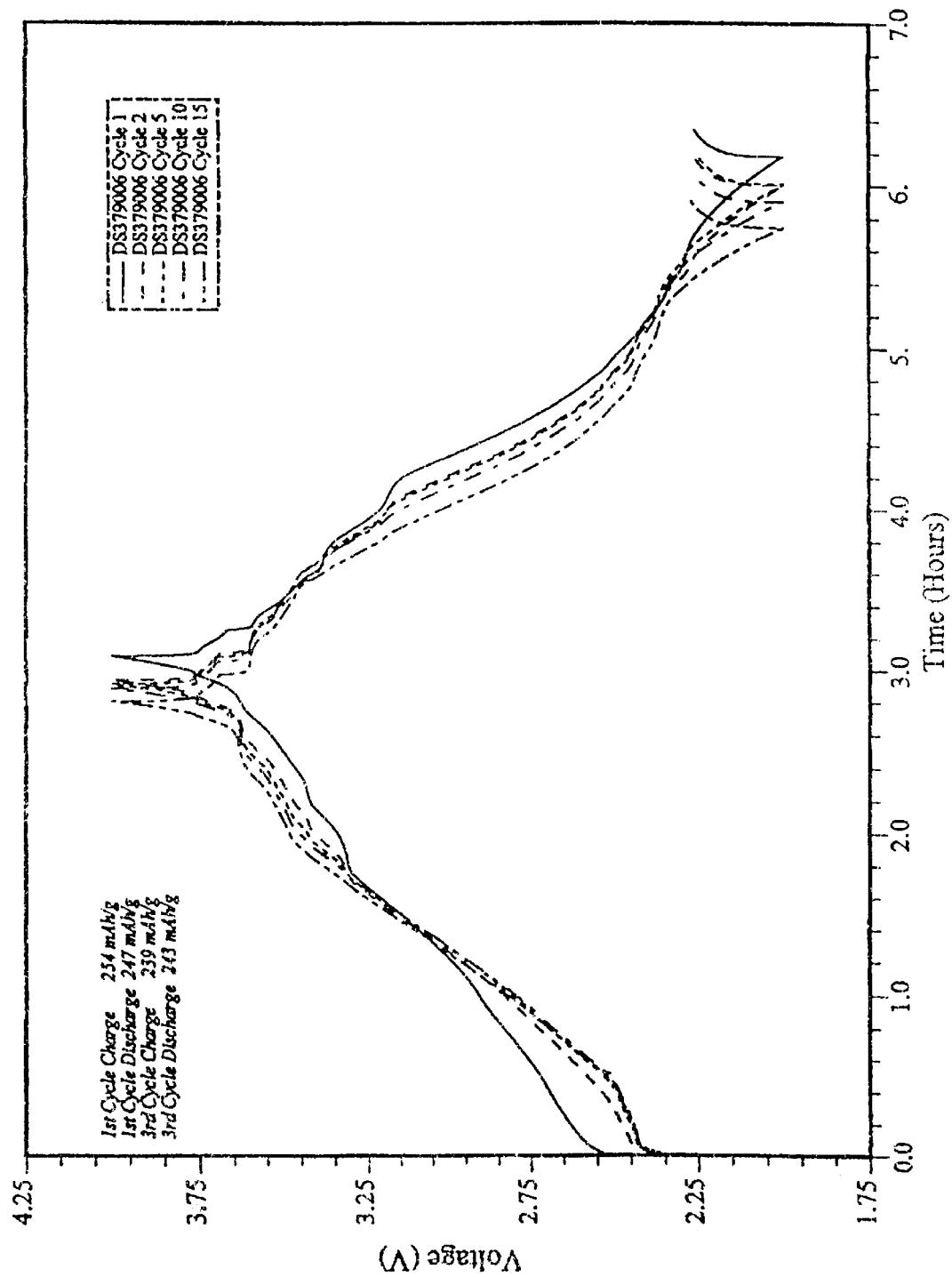
FIG. 3 shows the charge/discharge cycles for the battery of Example 3.

6.9 g of $V_2O_5$ and 0.5 g of biphenyl were added to 50 ml of tetrahydrofuran and stirred until the biphenyl was dissolved. The mixture was cooled to 6° C. on a cool plate and then 0.56 g of lithium metal was added in increments over a period of 1.5 hors. The reaction mixture was allowed to stir on the cool plate for an additional 2 hrs. The mixture was then allowed to stand at room temperature for 14 hrs. The resulting black solid was collected by filtration and washed with tetrahydrofuran. The sample was dried a room temperature. All the above operations were carried out in an argon atmosphere. The product was tested as in example 1. The results are shown in FIG. 3. Comparing the materials produced in Example 1 versus Examples 2 and 3, it can be seen that in the first cycle where benzophenone was used as a catalyst (Example 11) the lithiation is not as complete as in the Examples where biphenyl was used (Examples 2 and 3). It is especially evident if one compares the first plateau on the charge curve. In the case of the benzophenone reaction the first plateau is missing while in the biphenyl case the plateau is fully developed. This result is consistent with the calculated reaction potential shown in Table 2 above. While the calculation of the reaction potential is useful to predict trends, it should not be used in a rigorous manner because the values obtained from references were measured under different conditions that are used in the current system.

Having described the invention in detail and by reference to preferred embodiments thereof, it will be apparent that modifications and variations are possible with out departing from the scope of the invention defined in the appended claims.

What is claimed is:

1. A method for lithiating a metal compound, said method comprising reacting said metal compound with lithium metal in the presence of an aromatic hydrocarbon catalyst.

2. The process of claim 1 wherein the aromatic hydrocarbon has a reduction potential RP which satisfies the equation $$RP < OCP - 3.04$$

where OCP is the open cell potential of the lithiated compound.

3. The method of claim 1 wherein said metal compound is a vanadium oxide.

4. The method of claim 3 wherein said vanadium oxide is $V_6O_{13}$ or $V_2O_5$.

5. The method of claim 4 wherein said vanadium oxide is $V_6O_{13}$ and said catalyst is benzophenone or biphenyl.

6. The method of claim 5 wherein said catalyst is biphenyl.

7. The method of claim 4 wherein said vanadium oxide is $V_2O_5$ and said catalyst is biphenyl.

8. The method of claim 1 wherein said reaction is carried out in an inert atmosphere.

9. The method of claim 1 wherein said catalyst is present in an amount of about 0.1 to 20% by weight based on the amount of lithium.

10. The method of claim 1 wherein said metal compound is reacted with said lithium at a weight ratio of metal compound to lithium of about 10:1 to 20:1.

11. The method of claim 1 wherein said aromatic hydrocarbon reacts with said lithium to form a radical anion according to the equation $$Li + A \rightarrow Li^+ A^-$$

where A is an aromatic hydrocarbon.

* * * * *